United States Patent [19]

Swearingen

[11] 4,005,580
[45] Feb. 1, 1977

[54] SEAL SYSTEM AND METHOD

[76] Inventor: Judson S. Swearingen, 2235 Carmelina Ave., Los Angeles, Calif. 90064

[22] Filed: June 12, 1975

[21] Appl. No.: 586,491

[52] U.S. Cl. .................................. 60/657; 184/6; 277/15
[51] Int. Cl.² .................. F01K 25/18; F01K 25/22
[58] Field of Search ............ 60/657, 646, 651, 671; 277/15; 184/6

[56] References Cited

UNITED STATES PATENTS

| | | | |
|---|---|---|---|
| 3,392,804 | 7/1968 | La Fleur | 184/6 |
| 3,670,850 | 6/1972 | Swearingen | 277/15 X |
| 3,831,381 | 8/1974 | Swearingen | 60/657 |

*Primary Examiner*—Allen M. Ostrager

[57] ABSTRACT

The invention is a system and method for sealing about a shaft employed for conveying power between the interior of a working chamber having working fluid under high pressure, and the exterior of such chamber. The working fluid is sealed from escape along the shaft by interposing a liquid lubricated seal to sustain substantially all of the pressure differential, and between the working chamber and the lubricated seal interposing a second seal employing a sealing fluid which is preferably gaseous at the temperatures and pressures to which it is subjected. This second seal fluid is not significantly soluble in the first seal fluid used in the lubricated seal and is compatible with the working fluid used in the working chamber. The second sealing fluid is recirculated in a closed cycle in a manner to sweep the working fluid away from the lubricant and the lubricant away from the working fluid, there being provision for drawing off portions of the first and second seal fluids between the two seals and separating them from one another for reuse, and for drawing off the remaining portion of the second seal fluid and a portion of the working fluid between the second seal and the working chamber and separating the second seal fluid and working fluid from one another for reuse. Condensation and gravity separation are employed in the separations mentioned.

17 Claims, 5 Drawing Figures

SEAL SYSTEM AND METHOD

BACKGROUND OF THE INVENTION

1. Field of the Invention

The present invention pertains to a system in which there is a working fluid that passes through a rotary machine whose rotor is within a working chamber and which has a power shaft extending from said chamber through an opening in the wall thereof to the exterior thereof to transmit power between the interior of the chamber and the exterior thereof. It is specially adapted to a system in which a working fluid has power added thereto in the form of heat, after which it is passed through the working chamber and the rotor of the machine to give up its power and be recirculated to receive more heat power. The working fluid is thus captive and the purpose of the seal system of this invention is to conserve said fluid and prevent its loss by leakage from the working chamber along the shaft. Such shafts are frequently required to rotate at extremely high speeds such as to prohibit the use of seals of mechanical engagement type, making it necessary to resort to so-called fluid seals in which a fluid is injected into a small annular clearance between the shaft and its surrounding structure, intermediate the ends of such clearance, so that the fluid will flow in both directions at its point of injection. Such a system is illustrated generally in my prior U.S. Pat. No. 3,831,381, issued Aug. 27, 1974, on an application filed May 2, 1973.

The term "fluid" is used herein to designate a flowable medium, either gas or liquid.

In systems of this kind, the housing in which the rotor is located and through an opening in which the shaft emerges typically has bearings for the shaft with bearing surfaces on the shaft and within the opening in the housing through which the shaft passes. Such surfaces are dimensioned so as to be spaced apart sufficiently to permit a lubricant to be introduced at an intermediate point between the two bearing surfaces at such pressure as to cause it to flow in both directions from such intermediate point. In this arrangement, the lubricant flowing between the bearing surfaces toward the rotor prevents flow of the working fluid in the opposite direction and thus prevents its leakage from the system along the shaft. In order to prevent the liquid lubricant from becoming contaminated with working fluid, or vice versa, provision is made for withdrawing from between the shaft and housing at a point intermediate the rotor and the bearing, the lubricant flowing from the bearing toward the rotor and the working fluid flowing from the rotor around the shaft toward the bearing. However, this produces inevitably a rather intimate contact between these two fluid media causing them to mingle and to a greater or lesser degree dissolve in or react with one another. The result is an intermingled mixture or compound from which the components of lubricant and working fluid must be extracted if they are to be reused. The result is potential loss of working fluid or of lubricant or the desirable properties of one or the other, or in the alternative, a substantial expenditure in energy and equipment requirement in resegregating such components.

2. Description of the Prior Art

In my prior patent above mentioned, a labyrinth type seal is located around the shaft intermediate the rotor and the lubricated bearing and into this seal is injected a seal fluid, which may be a seal gas, but which is, in the specific illustration in said patent, a constituent of the working fluid. This seal gas or vapor, flowing through the labyrinth type seal in both directions from its point of injection, intermingles with the working fluid in the chamber in which the rotor is located, and intermingles with the lubricant in a chamber between the labyrinth seal and the bearing seal, from which chamber a mixture of lubricant and the seal gas are withdrawn. The seal gas is selected to be of such a character that it will not substantially dissolve in nor react with the lubricant. Hence in said patent, when they are withdrawn in more or less intermingled relation with one another, they may be readily separated from one another so that the lubricant from such separation step may be recirculated and reused and the seal gas may likewise be reused. Such seal gas, to be reused may be conveniently injected into the stream of working fluid leaving the chamber in which the rotor is located, and then recirculated with such working fluid to the point where the working fluid is heated for reuse. In this step, the seal gas component is, in said patent, separated from the remainder of the working fluid by fractional distillation or the like and then circulated back to the point of injection into the labyrinth seal, where it begins a new cycle.

Clearly the system set forth in my said prior patent requires the expenditure of a substantial amount of heat energy in separating the seal gas from the working fluid each time it passes through its cycle. Such heating, followed by the natural cooling and then reheating of the working fluid constituent employed as a seal gas naturally results in some additional loss of heat energy.

SUMMARY OF THE INVENTION

In the power system of the present invention there is utilized a sealing gas which is compatible with both and not significantly soluble in either the lubricating fluid and/or the working fluid. By being "compatible with", is meant in the present instance that it is chemically substantially non-reactive with the lubricant and working fluid and is not readily so intimately mixed with the lubricant or the working fluid as to keep it from being readily disengaged therefrom.

Other than the difference in seal gas employed, this present system differs from that of my prior patent in that between the labyrinth seal and the chamber in which the rotor is located and the working fluid contained, provision is made for drawing off, at a pressure close to but slightly less than that of the working fluid in the rotor chamber, such seal gas as may flow through the labyrinth seal toward the working chamber, and such working fluid as may flow from the working chamber toward the labyrinth seal. The pressures of injection of the lubricant and of the seal gas are so regulated that the lubricant seal will retain substantially the entire pressure differential between that in the working chamber and the atmosphere but only great enough to provide a small flow of lubricant toward the working chamber. The pressure of the seal gas being injected into the labyrinth seal is such as to induce only a small flow of such seal gas toward the working chamber and toward the lubricated bearing, and the rate of withdrawal of such seal gas from the position between the working chamber and the labyrinth seal is such as to induce also a very slight flow of working fluid toward the point of withdrawal.

Under these circumstances it will be seen that the seal gas will serve to sweep the lubricant away from the working chamber and prevent mixture of the lubricant with the working fluid and at the same time to prevent flow of the working fluid through the labyrinth seal toward the bearing and prevent consequent mixture of the lubricant and working fluid between the labyrinth seal and the bearing. The fluid drawn off from between the bearing and labyrinth seal and from between the labyrinth seal and the working chamber are each then treated to separate in the first instance the lubricant and the seal gas, and in the second instance the seal gas and the small quantity of working fluid entrained therewith as it is drawn off.

In the first instance, the drawn off mixture of lubricant and seal gas, maintained at a pressure almost as great as that in the working chamber, is introduced into a reservoir where it is allowed to separate by gravity into lubricant and seal gas, each being drawn off for reuse. The drawn off mixture of seal gas and working fluid is likewise separated for reuse, but inasmuch as at least a portion of the working fluid is likely to be in gaseous form at this point, it will not readily separate from the seal gas without treatment. Such treatment is provided by feeding the same into a condenser where it is chilled so as to condense the working fluid component and free it from the seal gas. The two streams of seal gas are mixed either before or after passing through such condenser and, by suitable circulating device such as a pump or compressor, are, after being united and separated from the lubricant and working fluid, reinjected into the system at an intermediate point in the labyrinth seal.

The condensed working fluid on the other hand is reintroduced into the system by injection into the stream of working fluid coming from the working chamber and going to the point at which it will be subjected to the addition of energy thereto so that it may be reused. The working fluid as a whole, is subjected to a condensation step and the condensate stored while it awaits reuse. It is then drawn from such storage, passed through a boiler to reabsorb energy, and then conducted to the input of the working chamber.

The seal gas is preferably selected to have such characteristics that will enable it to remain in gaseous form throughout the expected range of pressures and temperatures to be encountered in the operation of the system. Thus it does not require changing its phase from gas to liquid or vice versa in the course of the operation. Furthermore, the pressures at various points of the circulation of the seal gas may be so regulated that differentials between the high and low pressures of the seal gas will not be great and may be supplied by a simple recirculating compressor or pump.

An interface is maintained between the seal gas and the working fluid within the seal itself at the point where these two come together between the labyrinth seal and the working chamber, and in a vapor space above the accumulation of the working fluid after its condensation. Both can be independently drawn from such accumulation and recirculated as necessary.

Pursuant to the foregoing it is an object of this invention to provide an efficient seal for preventing waste through leakage of a working fluid from a working chamber along a shaft passing through a wall of said chamber to the exterior thereof.

A further object is to provide such a means in the form of a sweeping fluid seal employing a sweeping seal fluid which may be used and reused many times, without the expenditure of large amounts of energy in separating sweeping seal fluid from the working fluid or lubricant.

Another object of this invention is to provide a system for carrying out the foregoing in which the separation of the sweeping seal fluid from the working fluid is accomplished without heating either fluid.

Another object of the invention is to provide a system in which such separation of sweeping seal fluid from the working fluid is accomplished by means of cooling and condensation of the working fluid as contrasted with heating and vaporization of the seal fluid.

Another object of the invention is to provide a system of the character referred to in which the range of pressures to which the sweeping seal fluid will be subjected in operation is minimized.

Another object is to provide such a system employing a sweeping seal fluid which is gaseous at all conditions of pressure and temperature to be expected in the operation of the system.

Another object is to provide such a system in which the sweeping seal fluid will always be at a pressure substantially higher than atmospheric.

Another object is to provide such a system as that last mentioned in which leakage of fluid under pressure to the exterior is prevented by mechanical means providing a tight seal when the operation of the device becomes slow enough to permit the use of a mechanical seal, or, while the device is at rest.

Other objects and advantages of this invention will become apparent from the following description taken in connection with the accompanying drawing wherein is illustrated by way of example, and not by way of limitation, a preferred embodiment of the invention, and certain modifications thereof.

DESCRIPTION OF THE PREFERRED EMBODIMENT

Figure 1:
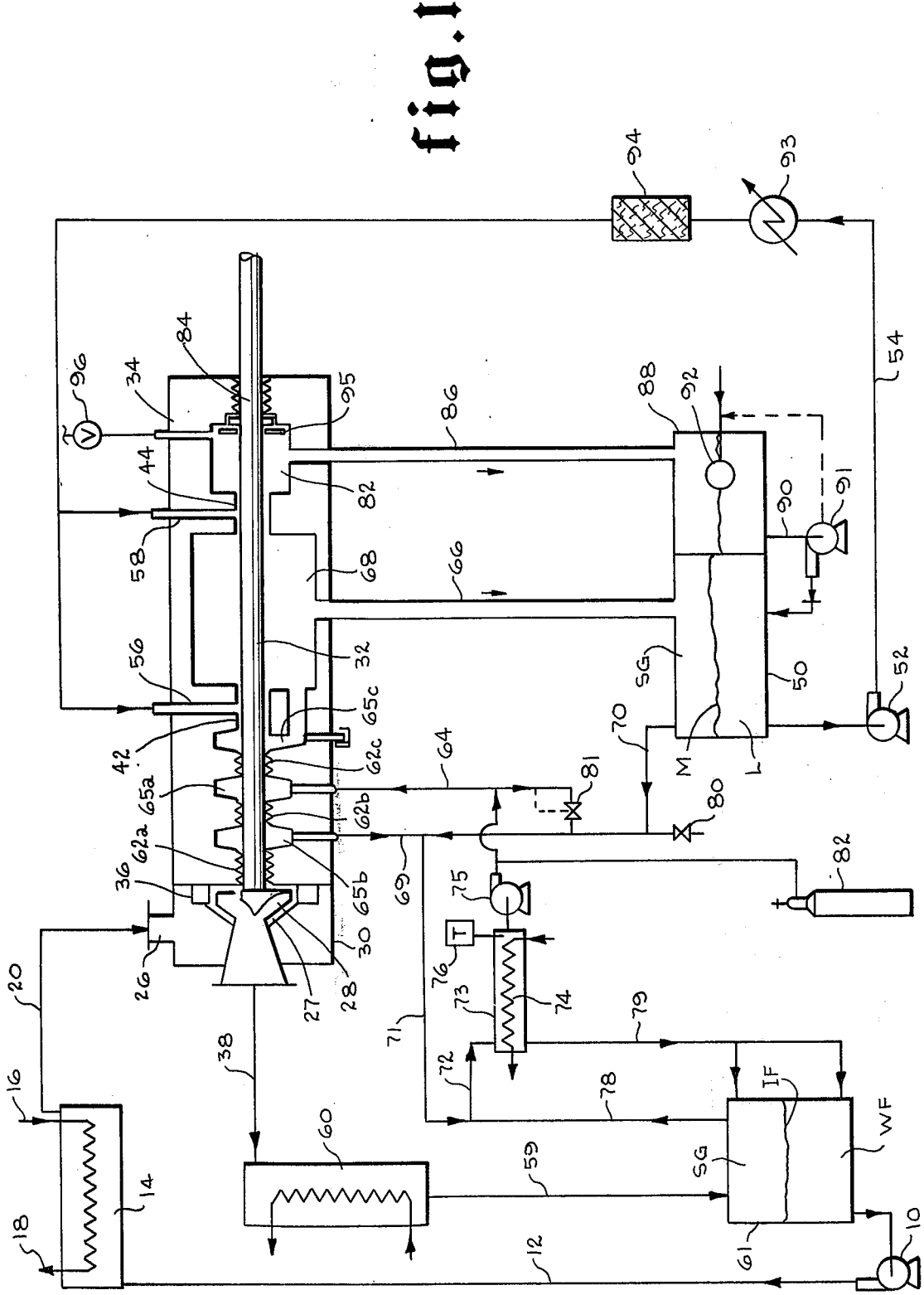
FIG. 1 is a flow diagram and a diagrammatic illustration of certain mechanical portions of a sealed power system constructed in accordance with the preferred embodiment of the invention.

The invention will be described with particular reference to a power system employing a turboexpander adapted to be operated by heat extracted from geothermal sources or the like, but it is to be understood that the invention is not so limited and is applicable to other types of systems involving sealed rotors for handling working fluids.

In the power system shown, a pump 10 is used to drive a working fluid through a line 12 and into a heat exchanger 14. The criteria for choosing the constituents of a working fluid of this type and for determining the proper proportion therefor may be those set forth in applicant's co-pending application Ser. No. 321,810, filed Jan. 8, 1973. To the extent that the disclosure of said application may be helpful in the understanding of the present invention, said disclosure is hereby incorporated herein by reference.

The heat exchanger 14 is preferably of the countercurrent type. As the working fluid passes through the heat exchanger 14 it may be vaporized and perhaps even superheated by a heating fluid passing through the heat exchanger countercurrent to the working fluid. The heating fluid may be, for example, hot water from an underground well. The heating fluid enters the heat exchanger 14 at 16 and exits at 18. After passing through the heat exchanger 14 the heating water is considerably cooler and is usually returned to the ground by means of another well.

The vaporized working fluid leaving the heat exchanger at 20 passes into the inlet 26 of a turboexpander. The turboexpander comprises a rotor 28 enclosed by a rotor housing 30. Integrally attached to the rotor 28 is a shaft 32. The shaft 32 is enclosed by a shaft housing 34 which, in the embodiment shown, is formed integrally with the rotor housing 30. The working fluid is directed radially into the rotor 28 by nozzles 36, whence it passes through the rotor 28 and exits in an axial direction through outlet line 38. As the working fluid vapor passes through the rotor 28, it expands and turns the rotor which in turn rotates the shaft 32. The rotating shaft 32 does work as by driving some type of engine located externally of the housing 30. The working fluid is then condensed by a condenser 60 and passes downwardly through a line 59 into a reservoir or accumulator 61 in which a quantity of working fluid is preferably contained at all times so as to partially fill the accumulator 61 and provide a source such that adequate quantity of working fluid will always be available. The working fluid is drawn from the accumulator 61 by the pump 10 and recycled through the system as before.

The shaft 32 is supported in housing 34 by first and second bearing assemblies 42 and 44 respectively. The annular, radially inner surfaces of bearing assemblies 42 and 44 serve as radial bearings to support the shaft 32.

A lubricant oil from a reservoir 50 is driven by a pump 52 through a lubricant line 54 and injected under pressure into the bearing assemblies 42 and 44 through respective first and second lubricant passageways 56 and 58. The lubricant flows radially and axially along the shaft in both directions lubricating the bearings and then collects in the bottom of housing 34 from which it is directed back to reservoir 50 by means presently to be described.

In the rotor and shaft housings 30 and 34 is a labyrinth seal illustrated as divided into three parts 62a, 62b, and 62c. To the left of the seal portion 62a the housing has an enlarged portion providing a process zone or working chamber 27 in which the rotor 28 is located and in which the working fluid is contained and does its work. To the right of the seal portion 62c the housing defines a lubricant zone 68 which traps lubricant flowing from the bearing seal 44 toward the working chamber and receives and traps the lubricant flowing in both directions from the bearing 42 so that no lubricant is permitted to flow toward the working chamber 27 further than the point at which it emerges from the bearing 42 in a direction toward the working chamber.

The three-part labyrinth seal 62a, 62b, and 62c separates the working chamber from the lubricant chamber 68 and seals are maintained in said labyrinth seal portions by the injection of a sweeping seal fluid which is preferably a gas at all temperatures and pressures expected to be encountered within the operation of the system, and which is no more than slightly soluble in the lubricant or the working fluid, and is compatible with both in that it is chemically inert to them. One suitable seal fluid for the working fluid of my prior application, above mentioned, would be nitrogen. Others may be used as will be apparent to those skilled in the art. This seal fluid is injected into the chamber 65a which is located between the labyrinth seal portions 62b and 62c. It flows along the shaft in both directions from the chamber 65a and thus sweeps the lubricant which otherwise might flow to the left through the labyrinth seals and toward the working chamber back toward the right, and simultaneously sweeps through the labyrinth seal portion 62b to the left and sweeps any working fluid therein back toward the working chamber. Thus this seal fluid sweeps the lubricant and the working fluid away from each other and prevents them from intermingling with each other. At the same time it forms two sweeping streams going in opposite directions, one of which enters the chamber 68 through the chamber 65c and produces an interface in the chambers 65c and 68 between the lubricant and the seal fluid. The other enters the chamber 65b and produces an interface therein between the working fluid and the seal fluid.

The mixture of the lubricant and seal fluid passes downwardly through the relatively large drain tube 66 into the reservoir 50 in which they rapidly separate by gravity producing a lower body of lubricant L and an upper body of sweeping seal gas SG with an interface M between them. Thus the seal gas must have as it enters the chamber 65a a pressure high enough to cause it to flow to the right through labyrinth seal portion 62c against the pressure of the lubricant and seal gas mixture in the chambers 65c and 68. It is noted further that the pressure in the upper portion of the reservoir 50, by virtue of the large drain tube 66, is maintained at substantially the same as that in the chamber 68 and chamber 65c. This means that the lubricant seal formed in the bearing 44 by the lubricant flowing in through the lubricant conduit 58 will sustain substantially the entire pressure differential between that existing inside the housing in chambers 65c and 68, and that of the ambient atmospheric pressure exterior of the device. Atmospheric pressure will be maintained substantially at all times during operation within the chamber 82.

The chamber 82 is connected by a large tube 86 with a lubricant reservoir 88 so that lubricant flowing through the bearing 44 to the right and entering the chamber 82 will drain through the drain tube 86 into chamber 88 where it will be collected under substantially atmospheric pressure. In this reservoir 88 any entrained air which it may have picked up during its passage through the chamber 82 and the drain tube 86 may be allowed to escape into the upper portion of the chamber and thence reversely through the drain tube 86 and the chamber 82 and out through the labyrinth opening 84 through which the shaft 32 passes.

Lubricant collecting in the chamber 88 will be drawn from this chamber through a drain conduit 90 and by means of a pump 91 will be injected into the lower portion of the chamber 50 at the pressure being maintained in that chamber as heretofore explained. The drainage of lubricant from the chamber 88 by means of the pump 91 will be controlled by a suitable means such as the float control 92.

The lubricant being circulated through the bearings 42 and 44 by the pump 52 will be forced through a cooler 93 and a filter 94 as it flows toward these bearings so that when it enters the bearings it will be relatively cool and will be free from grit and the like which might otherwise injure the bearings.

The sweeping seal fluid or gas will be injected into the chamber γa through a conduit 64, and that portion above mentioned which flows to the left through the labyrinth seal 62b into the chamber 65b, will be trapped and drawn off from the chamber 65b through the conduit 69. Preferably the pressure of injection of the seal fluid into the chamber 65a is such that as it emerges into the chamber 65b the pressure will have fallen to a pressure slightly lower than that of the working pressure of the working fluid in the chamber 27. Thus there will be a minimal flow of working fluid through the labyrinth seal 62a toward the right into the chamber 65b where it will be mingled with and drawn off with the sealing fluid entering this chamber from the seal 62b. Preferably the pressure of the sealing fluid entering chamber 65a will be kept as close as practicable to that which will maintain a pressure in the chamber 65b slightly lower than the working pressure in the chamber 27 and yet avoid danger of getting higher than such working pressure, so that there will never be any flow of seal fluid from the chamber 65b to the working chamber 27, but always of working fluid in the opposite direction although by a minimal amount.

Fluid drawn off from the chamber 65b, which is made up of seal gas mingled with a small proportion of working fluid, will be joined by seal gas flowing from the upper portion SG of the reservoir 50 through the conduit 70, and these combined streams will flow through the conduit 71 and the conduit 72 into the condenser 73 wherein they will be chilled by a refrigerant or some cooling fluid passing countercurrently through the condenser 73 within the coil 74.

This chilling action in the condenser 73 will be such as to condense the small proportion of working fluid mixed with the seal gas and which may itself be in a gaseous state. Upon being condensed it will readily separate from the seal gas and the seal gas will then be withdrawn from the condenser 73 by the pump 75 and reinjected into the chamber 65a through the conduit 64.

The quantity of sweeping seal gas in the system will be indicated by the temperature of the seal gas leaving the condenser 73 as sensed by the temperature sensor 76.

As the seal gas mixture with working fluid passes through the conduit 71 on its way to the condenser 73, any condensed working fluid therein will be allowed to bypass the condenser 73 through the conduit 78 into the reservoir 61 where, as hereinbefore explained, a supply of the working fluid is contained as a condensate in the bottom of this reservoir.

Likewise, working fluid condensed within the condenser 73 will be drained from the bottom of that condenser through a conduit 79 into the lower portion of the reservoir 61 so that working fluid may be drawn from the bottom of this reservoir by the pump 10 and recirculated as previously indicated. Furthermore, in the reservoir 61 there is an interface maintained with seal gas which occupies the upper portion of this reservoir and constitutes a body of such seal gas from which seal gas may be withdrawn as and when desired. It will be withdrawn when needed through the line 78 and the conduit 72 into the condenser 73.

In the event the supply of seal gas in the entire system becomes too great for any reason, a part of it may be bled off through the valve 80, or if the pressure becomes too great in the output from the pump 75, the valve 81 may be opened either manually or automatically by the existence of the excessive pressure, and the necessary amount of seal gas bled off from the system through the valve 80.

On the other hand, if the supply of seal gas becomes too low, it may be replenished in the system by injecting the same from a bottle of gas such as 83.

From the foregoing description it will be understood that during operation of the system substantially the entire differential of pressure between the working fluid chamber 27 and the surrounding ambient atmosphere will be taken by the lubricated bearing seal 44 so that the pressure in the chamber 68 within the housing 34 will be very close to that in the working chamber 27, whereas that in the chamber 82 will be substantially atmospheric. Thus, during operation, both the working fluid pressure range and the seal gas pressure range will be relatively small and will be close to the pressure maintained in the working fluid in the working chamber 27.

This pressure differential between inside and outside the system can be maintained during operation of the device by means of the fluid gas and lubricant seal arrangement described whereas it could not be so maintained by a mechanical seal such as stuffing box, lip-type rubber seal of the like employing mechanical engagement of parts because of the high speed at which such systems are usually operated. For the purpose of preventing excessive leakage from the system during periods of shutdown, however, a mechanical seal arrangement is provided at the entrance to the labyrinth opening through which the shaft 32 emerges from the chamber 82. This comprises a valve in the form of an annular member 95, located around the shaft at the entrance to the opening from which the shaft emerges. As long as the pressure within the chamber 82 is maintained close to atmosphereic pressure, there will be no force holding this valve member 95 tightly against the end wall of the chamber 82 to close the opening therethrough, but when, with shutdown approaching, the flow of lubricant sealing fluid into the bearing 44 may be slowed and the pressure in the chamber 82 thereby permitted to rise through leakage from the chamber 68, this increasing pressure within the chamber 82 being higher than that in the atmosphere exterior of the device, will force the valve member 95 tightly against the end wall of the chamber 82 and close the passageway therethrough to prevent leakage to the exterior along the shaft.

Upon start up accumulation of the liquid within the chamber 88 will shortly activate the pump 91 through action of the float controller 92 and create a differential of pressure between the reservoir 50 and the chamber 88. However, it is important that the valve member 95 be opened immediately on or slightly before start up to avoid damage to valve 95. Therefore a relief valve 96 may be utilized for relieving the pressure in chamber 82 before start up until it is substantially at atmospheric pressure whereupon the valve member 95 will open. Meantime, seal gas and perhaps a small amount of working fluid which may have collected within the chamber 82 and thence into the chamber 88, will be injected into the chamber 50 in which the seal gas and at least part of the working fluid will be separated as hereinbefore described, and, drawn off through the line 70 into the seal gas portion of the system, thence it will go to the condenser 73 wherein the seal gas and working fluid will be separated as previously described. Thus upon start up the atmospheric pressure condition prevailing in the chamber 82 during operation will quickly be recreated.

Figure 2:
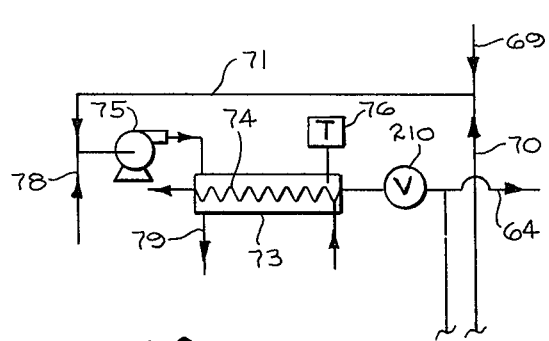
FIG. 2 is a view illustrating a fragmentary portion of the system of FIG. 1 but showing a modification thereof.

Upon reference now to FIG. 2 there is illustrated an alternative situation in which the pump or compressor 75 is replaced in the stream of seal gas going to the condenser 73 instead of in the stream leaving such condenser. This creates a higher pressure within the condenser and makes it possible to condense the working fluid partly or wholly by virtue of pressure and thus makes possible the elimination of part or all of the refrigeration otherwise required to cool the condenser. The cooling coil in the condenser would still be used to carry the heat away, but such heat could be carried by cooling water instead of a refrigerant if so desired.

In order that this system may work satisfactorily it is necessary that a backpressure valve 210 be located in the output line from the condenser.

Figure 3:
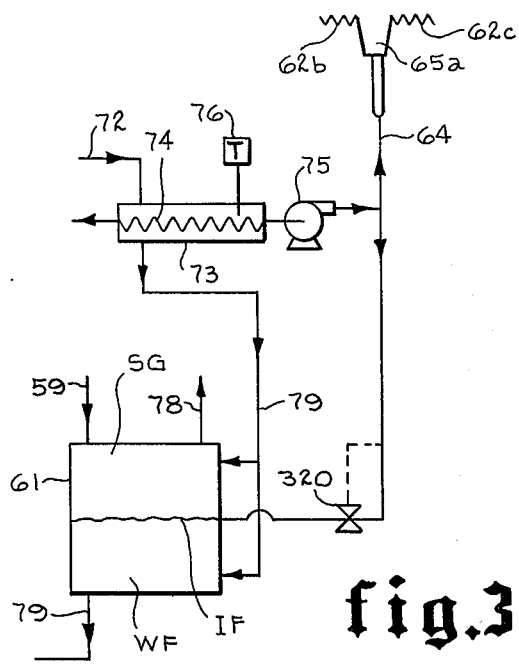
FIG. 3 is another fragmentary portion of the system illustrated in FIG. 1, showing diagrammatically a further modification.

It has been explained that in the event of excessive pressure in the system such as for example in the output line from the compressor 75, the valve 81 could be activated to open position by such pressure or manually in order to bleed pressure back into the upper portion of the chamber 50. As an alternative to this there is shown in FIG. 3 an arrangement in which such a backpressure valve 320 has its output connected to the reservoir 61 at a suitable point adjacent the body of the seal gas therein. By this means, excessive pressure in the seal gas flowing to chamber 65a will be relieved by bypassing to the reservoir 61 without wasting seal gas.

Figure 4:
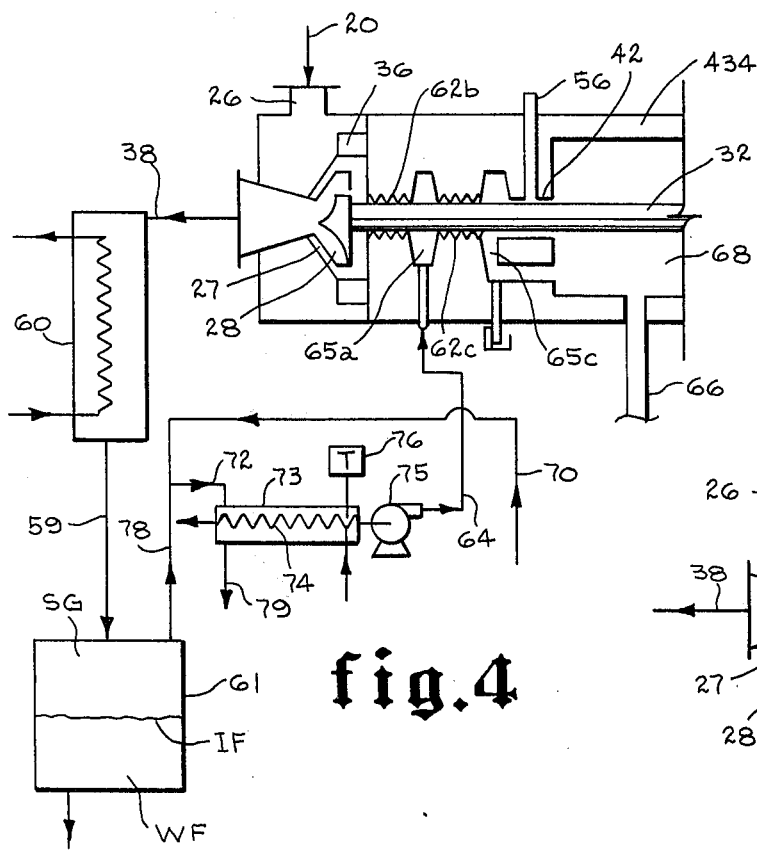
FIG. 4 is another fragmentary diagrammatic illustration of still another modification of the invention.

In FIG. 4 is shown a modified form of labyrinth seal in which the seal segment 62a is eliminated from housing 434 and with it the chamber trap 65b and the withdrawal line 69. All the seal gas flowing to the left from the chamber 65a through the seal segment 62b will enter and mingle with the working fluid in the working chamber 27 and thence through line 38 to the condenser 60 and reservoir 61. From reservoir 61 it would flow through lines 78 and 72 to condenser 73 where it would be finally separated from working fluid and then sent back through line 64 to the labyrinth seal by pump or compressor 75.

Figure 5:
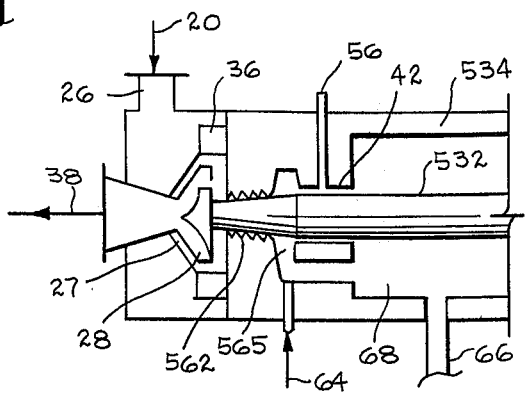
FIG. 5 is a fragmentary diagrammatic illustration of a still further modification.

In FIG. 5 seal segment 62c is also eliminated from the labyrinth seal in housing 534, and the seal gas is injected into chamber 565 just to the left of and directly adjacent bearing 42. Pressure in chambers 68 and 565 should be maintained slightly higher than in the working chamber so as to force the seal gas to flow through labyrinth seal segment 562 toward the working chamber. Thereafter it would follow the course described in connection with FIG. 4. That mingling with the lubricant in chambers 68 and 565 will be recovered the same as in the previously described forms. In this form, flow of lubricant from chamber 565 into the working chamber 27 may be held to a minimum by making the mating parts of the seal 562 on the shaft 532 and in the housing 534 tapered.

I claim:

1. In a system including a working chamber closed to the exterior except for a working fluid inlet and outlet and a shaft passing through an opening in a wall of the chamber, said chamber containing a captive working fluid subject to being evaporated and condensed under pressures and temperatures within predetermined ranges to be employed in the system during operation, and a seal means for preventing escape of said working fluid from said chamber along said shaft, said seal means comprising a lubricant type bearing seal spaced from said chamber with means for injecting lubricant into said bearing seal intermediate its extremities and under pressure greater than the working pressure within said chamber so that part of the lubricant injected will flow in said bearing seal toward said chamber, means for trapping lubricant flowing from said bearing seal toward said chamber before it reaches said chamber, a labyrinth type seal between said chamber and said trapping means, means for injecting a seal fluid into said labyrinth type seal with a portion of the labyrinth seal between the chamber and the point of such injection, and at a pressure great enough to cause the seal fluid to flow toward said chamber and thereby prevent escape of working fluid through said labyrinth type seal means to the point of injection of seal fluid, and cause part of the seal fluid to flow toward and into said trapping means and thereby prevent the flow of lubricant toward said chamber through said labyrinth seal, the improvement which comprises a separator in communication with said trapping means for receiving and separating from one another a mixture of said lubricant and seal fluid so received, condenser means connected to receive such seal fluid as flows through said labyrinth type seal toward said chamber, and for cooling said mixture to condense and separate working fluid from the seal fluid, said means for injecting seal fluid being connected to draw seal fluid from the seal fluid from said separator and condenser means.

2. A system as set forth in claim 1 in which the point of injection of the seal fluid is at the opposite end of the labyrinth type seal from said chamber.

3. A system as set forth in claim 1 in which the point of injection of the seal fluid is directly into said trapping means.

4. A system as set forth in claim 1 in which the point of injection of the seal fluid is at an intermediate point along the length of the labyrinth type seal.

5. The improvement set forth in claim 1 in which said seal fluid is nonreactive and not significantly soluble in either the working fluid or the lubricant.

6. The improvement set forth in claim 1 in which said seal fluid is nonreactive and not significantly soluble in either the working fluid or the lubricant and is of a nature that it is gaseous throughout said pressure and temperature ranges.

7. The improvement set forth in claim 1 in which said predetermined pressure range is superatmospheric throughout the range.

8. The improvement set forth in claim 7 in which the lubricant type seal separates said seal fluid under superatmospheric pressure less than its highest pressure, from ambient atmospheric pressure externally of said system.

9. The improvement set forth in claim 8 in which a portion of the lubricant leakage from said lubricant type bearing seal is directly to the ambient atmospheric pressure and temperature externally of the system, in combination with means for reinjecting said lubricant into the lubricant containing portion of said separator.

10. The improvement set forth in claim 9 in which the space into which said lubricant leakage occurs is enclosed except for an annular labyrinth type opening around said shaft through which it is exposed to the exterior of the system, an auxiliary mechanical seal means engageable within and throughout a speed range of said shaft from zero r.p.m. to a rotary speed less than the normal operative speed of said shaft, to provide a complete mechanical seal of said annular space during periods of nonoperation of the system, so as to prevent leakage of lubricant, seal gas, and working fluid through said annular space when the system is not in operation.

11. In a system including a working chamber closed to the exterior except for a working fluid inlet and outlet and a shaft passing through an opening in a wall of the chamber, said chamber containing a captive working fluid subject to being evaporated and condensed under pressures and temperatures within predetermined ranges to be employed in the system during operation, and a seal means for preventing escape of said working fluid from said chamber along said shaft, said seal means comprising a lubricant type bearing seal spaced from said chamber with means for injecting lubricant into said bearing seal intermediate its extremities and under pressure greater than the working pressure within said chamber so that part of the lubricant injected will flow in said bearing toward said chamber, means for trapping lubricant flowing from said bearing seal toward said chamber before it reaches said chamber, a labyrinth type seal between said chamber and said trapping means, means for injecting a seal fluid into said labyrinth type seal with a portion of the labyrinth seal between the chamber and the point of such injection, and at a pressure great enough to cause the seal fluid to flow toward said chamber and thereby prevent escape of working fluid through said labyrinth type seal means to the point of injection of seal fluid, and cause part of the seal fluid to flow toward and into said trapping means and thereby prevent the flow of lubricant toward said chamber through said labyrinth seal, the improvement which comprises a separator in open communication with said trapping means for receiving and separating from one another a mixture of said lubricant and seal fluid so received, condenser means in open communication with said labyrinth seal between the point of injection of said seal fluid and said chamber to receive such seal fluid as it flows through said labyrinth type seal toward and before it reaches said chamber, together with seal fluid from said separator, and for cooling said mixture to condense and separate any working fluid from the seal fluid, said means for injecting being connected to draw seal fluid from seal fluid from which working fluid has been so separated.

12. The improvement set forth in claim 11 in which said seal fluid is of a nature that is gaseous throughout said pressure and temperature ranges.

13. The improvement set forth in claim 11 in which said means for injecting is capable of maintaining a pressure in said condenser lower than that in said chamber.

14. The improvement set forth in claim 11 in which said means for injecting propels said seal fluid through a cycle including the labyrinth seal means, sump, separator and condenser, said cycle being closed against escape of seal fluid to the atmosphere.

15. The method of preventing leakage of a working fluid at a relatively high pressure along an annulus between a housing enclosing a chamber containing said working fluid and a shaft extending from said chamber through an opening in said housing, to a space at relatively lower pressure exterior of said chamber, comprising injecting a lubricant into said annulus at a point spaced from said chamber and under pressure greater than that of the working fluid in said chamber to cause the lubricant to flow through said annulus in both directions from the point of injection, injecting into said annulus at a point between said chamber and the point of injection of the lubricant, a seal fluid non-reactive with and not significantly soluble in either the working fluid or the lubricant to cause said seal fluid to flow in both directions from its point of injection through said annulus, trapping said lubricant and seal fluid flowing toward one another at a location between said points of injection, whereby there will be a lubricant-seal fluid contact at the location of said trapping, separating the trapped seal fluid and lubricant flowing to the location of said trapping to produce substantially lubricant free seal fluid, chilling the seal fluid flowing toward said chamber from the point of its injection, together with working fluid mixed therewith to separate working fluid therefrom and produce seal fluid substantially free of working fluid, reinjecting the thus separated lubricant and seal fluid, and returning the working fluid separated from said seal fluid to the body of working fluid.

16. The method of claim 15 in which the seal fluid flowing from its point of injection toward said chamber is drawn off before it reaches said chamber and chilled to separate any working fluid therefrom.

17. The method of claim 15 in which the lubricant and working fluid separated from the seal fluid are collected into reserve liquid bodies separated from one another pending reinjection and the seal fluid from which they are separated is collected over said lubricant and working fluid liquid bodies with an interface therewith pending reinjection.

* * * * *

UNITED STATES PATENT AND TRADEMARK OFFICE
CERTIFICATE OF CORRECTION

PATENT NO. : 4,005,580
DATED : February 1, 1977
INVENTOR(S) : Judson S. Swearingen It is certified that error appears in the above-identified patent and that said Letters Patent are hereby corrected as shown below:

In column 7, line 10, delete "ya" and insert therefor --65a--.

Signed and Sealed this

Fourteenth Day of June 1977

[SEAL]

Attest:

RUTH C. MASON
Attesting Officer

C. MARSHALL DANN
Commissioner of Patents and Trademarks